United States Patent
Cheng et al.

(10) Patent No.: US 9,841,826 B2
(45) Date of Patent: Dec. 12, 2017

(54) AUTOMATIC TEST SYSTEM AND TEST METHOD FOR COMPUTER, RECORD MEDIUM, AND PROGRAM PRODUCT

(71) Applicant: National Central University, Jhongli (TW)

(72) Inventors: Yung-Pin Cheng, Taipei (TW); Ming-Che Cheng, New Taipei (TW)

(73) Assignee: National Central University, Jhongli (TW)

( * ) Notice: Subject to any disclaimer, the term of this patent is extended or adjusted under 35 U.S.C. 154(b) by 151 days.

(21) Appl. No.: 14/714,263

(22) Filed: May 16, 2015

(65) Prior Publication Data
US 2015/0347270 A1  Dec. 3, 2015

(30) Foreign Application Priority Data
May 28, 2014 (TW) .............................. 103118565 A

(51) Int. Cl.
 G06F 11/36  (2006.01)
 G06F 3/03  (2006.01)

(52) U.S. Cl.
 CPC ............... *G06F 3/03* (2013.01); *G06F 11/36* (2013.01); *G06F 11/3664* (2013.01); *G06F 11/3688* (2013.01)

(58) Field of Classification Search
 CPC ... G06F 11/3664; G06F 11/3688; G06F 11/36
 See application file for complete search history.

(56) References Cited

U.S. PATENT DOCUMENTS

| | | | | |
|---|---|---|---|---|
| 5,218,605 A | * | 6/1993 | Low .................... | G06F 11/2273 714/45 |
| 7,162,407 B2 | * | 1/2007 | Poley .................. | G06F 11/2294 703/24 |
| 7,840,948 B2 | * | 11/2010 | Chace ................. | G06F 11/3684 717/108 |
| 2003/0070120 A1 | * | 4/2003 | Michael ............. | G06F 11/3664 714/38.14 |
| 2007/0198676 A1 | * | 8/2007 | Vertes ................ | G06F 11/3664 709/223 |
| 2010/0017658 A1 | * | 1/2010 | Yang .................... | G06F 11/261 714/35 |
| 2010/0058366 A1 | * | 3/2010 | Swildens ............ | G06F 11/3414 719/329 |

(Continued)

*Primary Examiner* — Yolanda L Wilson
(74) *Attorney, Agent, or Firm* — Ice Miller LLP

(57) ABSTRACT

An automatic test method for a computer includes the following steps: reading a keyboard signal or mouse signal and a delay time in an event file in a system test directory; sending the keyboard signal or mouse signal to a to-be-tested system according to the delay time; the to-be-tested system that operates according to the keyboard signal or mouse signal sending at least one response; and verifying the response by comparing the response, which is in the form of a character string, with a character string in a correct text file in the system test directory, or sending an image acquisition signal to the to-be-tested system according to the at least one response, to acquire a screenshot, converting the screenshot into a screenshot image file, and verifying the screenshot image file corresponding to the to-be-tested system by comparing the screenshot image file with a correct screenshot image file in the system test directory.

14 Claims, 15 Drawing Sheets

(56) References Cited

U.S. PATENT DOCUMENTS

| | | | |
|---|---|---|---|
| 2012/0324424 A1* | 12/2012 | Breeds | G06F 11/3684 717/110 |
| 2014/0132571 A1* | 5/2014 | Zeng | G06F 17/30 345/178 |
| 2014/0195217 A1* | 7/2014 | Myrick | G06F 17/5009 703/21 |

* cited by examiner

AUTOMATIC TEST SYSTEM AND TEST METHOD FOR COMPUTER, RECORD MEDIUM, AND PROGRAM PRODUCT

BACKGROUND

Technical Field

The present invention relates to the field of computer technologies, and in particular, to an automatic test system and test method for a computer, a record medium, and a program product.

Related Art

Industrial computer or Basic Input Output System (BIOS) manufacturers need to perform a series of tests after modifying program code or hardware design, so as to make sure that the modification and the new mainboard are capable of executing program code normally while original functions are not destroyed. For example, a conventional mainboard test system may use multiple test programs during tests, so as to perform different test functions or processes. However, these tests are usually labor-consuming and time-consuming.

SUMMARY

In view of the foregoing problem, an objective of the present invention is to provide an automatic test system and test method for a computer, a record medium, and a program product, which use capture and replay technologies. A test engineer first operates a test case in a correct system; an automatic test system captures the test process, so as to edit the test process into a correct system behavior case, which is used as a correctness reference in future regression testing. When a computer or BIOS changes or is updated and needs to be checked, these captured test cases are automatically executed on the to-be-tested system, and the test engineer does not need to manually operate these test cases repeatedly, thereby saving a lot of labor and time.

A first aspect of the present invention provides an automatic test method for a computer, which includes the following steps:

a capture and replay verification module reading a keyboard signal or a mouse signal, and a delay time triggered by the keyboard signal or the mouse signal in an event file in a system test directory;

the capture and replay verification module sending the keyboard signal or the mouse signal to a to-be-tested system according to the triggered delay time and through a universal serial bus (USB) simulator;

the to-be-tested system that operates according to the keyboard signal or the mouse signal sending at least one response to the capture and replay verification module; and the capture and replay verification module verifying the at least one response by comparing the response, which is in the form of a character string, with a character string in a correct text file in the system test directory, or the capture and replay verification module sending an image acquisition signal to an image acquisition module according to the at least one response, the image acquisition module acquiring an image screenshot in the to-be-tested system, converting the image screenshot into an image screenshot image file, and sending the image screenshot image file to the capture and replay verification module, and the capture and replay verification module verifying the image screenshot image file corresponding to the to-be-tested system by comparing the image screenshot image file with a correct image screenshot image file in the system test directory.

A second aspect of the present invention provides an automatic test system for a computer, which includes:

a capture and replay verification module, used to receive a keyboard signal or a mouse signal output by a keyboard or a mouse, and receive at least one response output by a to-be-tested system;

an image acquisition module, electrically connected to the capture and replay verification module and the to-be-tested system; and a USB simulator, electrically connected to the capture and replay verification module and the to-be-tested system, where the capture and replay verification module, the image acquisition module, and the USB simulator execute the method of the first aspect of the present invention.

A third aspect of the present invention provides a record medium that stores a program, and after loading the program in the record medium and executing the program, an automatic test system is capable of performing the method of the first aspect of the present invention.

A fourth aspect of the present invention provides a program product that stores a program, and after loading the program in the program product and executing the program, an automatic test system is capable of performing the method of the first aspect of the present invention.

DETAILED DESCRIPTION

To help persons of ordinary skill in the art further understand the present invention, the following describes the content of the present invention and the effect to be achieved in detail with reference to the preferred embodiments of the present invention and the accompanying drawings.

Figure 1:
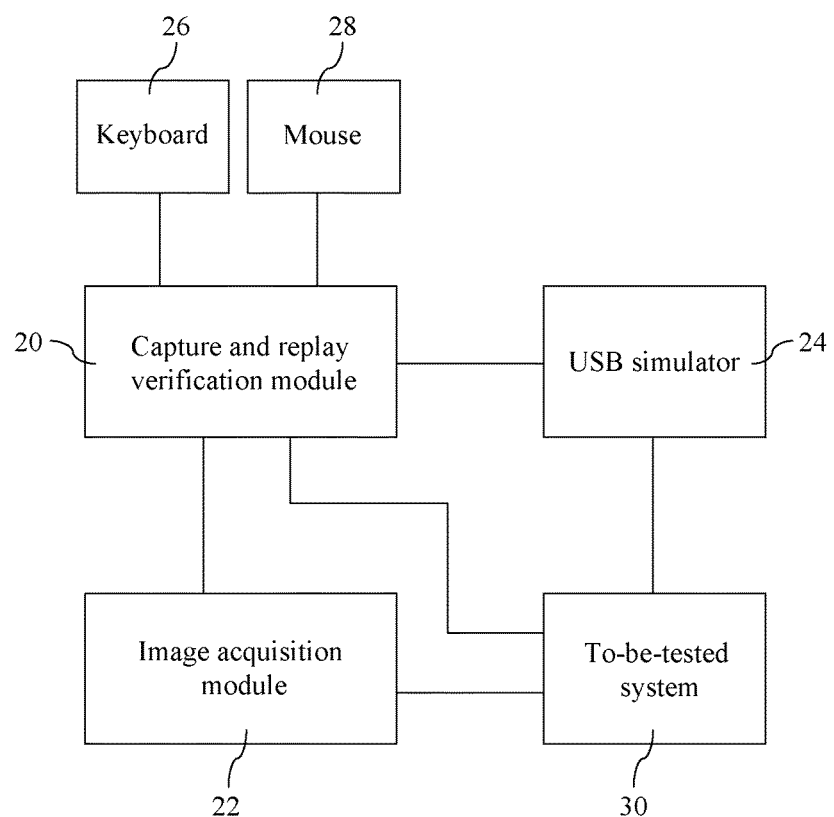
FIG. 1 is a block diagram of an automatic test system used for testing a computer according to the present invention.

FIG. 1 is a block diagram of an automatic test system used for testing a computer according to the present invention. In FIG. 1, the automatic test system includes a capture and replay verification module 20, an image acquisition module 22, and a USB simulator 24.

The capture and replay verification module 20 receives a keyboard signal or a mouse signal output by a keyboard 26 or a mouse 28, and receives at least one response output by a to-be-tested system 30. The image acquisition module 22 is electrically connected to the capture and replay verification module 20 and the to-be-tested system 30, which, for example, is an industrial computer. The USB simulator 24 is electrically connected to the capture and replay verification module 20 and the to-be-tested system 30.

The capture and replay verification module 20 converts the received keyboard signal into character string data (such as English letter characters), and converts the received mouse signal into digital data (such as coordinate position data and moving speed data). The capture and replay verification module 20 stores the character string data or the digital data, which is converted from the keyboard signal or the mouse signal, as an event file, where the event file also includes a delay time triggered by the keyboard signal or the mouse signal; and the capture and replay verification module 20 sends the character string data or the digital data to the USB simulator 24. The USB simulator 24 then separately converts the received character string data or digital data into the keyboard signal or mouse signal, and outputs the keyboard signal or mouse signal to the to-be-tested system 30, so that the keyboard signal or mouse signal is used as an operation instruction or operation data of the to-be-tested system 30.

The capture and replay verification module 20 sends a capture signal to the image acquisition module 22. After receiving the capture signal, the image acquisition module 22 receives an image output by the to-be-tested system 30, converts the received image into a received image file, and sends the received image file to the capture and replay verification module 20. The capture and replay verification module 20 displays, in a system test interface on a screen (not shown) according to the received image file, the image currently executed by the to-be-tested system 30.

When the automatic test system is in a capture mode, the capture and replay verification module 20 receives the at least one response sent by the to-be-tested system 30, and stores the at least one response in the form of a character string and as a text file. The capture and replay verification module 20 sets, according to the at least one response, the received image file corresponding to the image currently displayed in the system test interface as a correct screenshot image file. The capture and replay verification module 20 stores the screenshot image file in the system test directory, where the screenshot image file can be used for verification comparison, and is used as the image of a correct to-be-tested system 30.

After receiving a precondition signal, the capture and replay verification module 20 sets the received image file corresponding to the image currently displayed in the system test interface as a precondition image file. The capture and replay verification module 20 stores the precondition image file in the system test directory, where the precondition image file can be used for triggering an event subsequently, so as to capture the image of the correct to-be-tested system 30.

Before the capture and replay verification module 20 captures the image of the correct to-be-tested system 30, the capture and replay verification module 20 stores the character string data or digital data which is temporarily stored previously and corresponding to the keyboard signal or mouse signal, and the triggered delay data as a new event file.

When the automatic test system is in the capture mode, the capture and replay verification module 20 sequentially stores, in a system test directory, at least one of the event file of the correct to-be-tested system 30, the precondition image file used for triggering an event subsequently, the correct screenshot image file used for verification comparison, and the text file according to a file creating sequence of the correct to-be-tested system 30 during the test operation.

When the automatic test system is in a replay mode, the capture and replay verification module 20 reads the event file, the precondition image file, and the correct screenshot image file and text file in the system test directory. The capture and replay verification module 20 reads, in the event file, the character string data corresponding to the keyboard signal or the digital data corresponding to the mouse signal, and the delay time triggered by the keyboard signal or the mouse signal. The capture and replay verification module 20 sends the character string data or digital data, and the delay time to the USB simulator 24. The USB simulator 24 converts the received character string data or digital data into the corresponding keyboard signal or mouse signal, and sends the keyboard signal or mouse signal to the to-be-tested system 30 according to the delay time, so that the to-be-tested system 30 operates a program according to the keyboard signal or the mouse signal.

When the to-be-tested system 30 operates the program according to the keyboard signal or mouse signal corresponding to the character string data or digital data in the executed event file, the to-be-tested system 30 sends at least one response to the capture and replay verification module 20 during the program operation process. The capture and replay verification module 20 sends an image acquisition signal to the image acquisition module 22 according to the at least one response. The image acquisition module 22 acquires a screenshot of the program currently executed by the to-be-tested system 30, converts the screenshot into a screenshot image file, and sends the screenshot image file to the capture and replay verification module 20. The capture and replay verification module 20 reads the precondition image file which is after the executed event file in the system test directory, and compares the screenshot image file corresponding to the to-be-tested system 30 with the precondition image file. When content of the two image files is the same, the capture and replay verification module 20 reads an event file which is after the precondition image file in the system test directory, and continues to execute the event file.

Moreover, when the to-be-tested system 30 operates the program according to the keyboard signal or mouse signal corresponding to the character string data or digital data in the executed event file, the to-be-tested system 30 sends a response to the capture and replay verification module 20 during the program operation process. The capture and replay verification module 20 verifies the response by comparing the response, which is in the form of a character string, with a character string in a correct text file in the system test directory. The capture and replay verification module 20 outputs information indicating correctness or failure according to a result of the verification comparison. Alternatively, the capture and replay verification module 20 sends an image acquisition signal to the image acquisition module 22 according to the response; the image acquisition module 22 acquires a screenshot of the program currently executed by the to-be-tested system 30, converts the screenshot into a screenshot image file, and sends the screenshot image file to the capture and replay verification module 20; the capture and replay verification module 20 reads a correct screenshot image file in the system test directory, and verifies the screenshot image file corresponding to the to-be-tested system 30 by comparing the screenshot image file with the correct screenshot image file; and the capture and replay verification module 20 sends information indicating correctness or failure according to a result of the verification comparison.

When the capture and replay verification module 20 verifies the screenshot image file corresponding to the to-be-tested system 30 by comparing the screenshot image file with the precondition image file or the correct screenshot image file in the system test directory, the capture and replay verification module 20 may perform verification comparison by using a full operation interface, perform verification comparison by acquiring a part of the operation interface, or perform verification comparison by using characters obtained by performing optical character recognition (OCR) on the operation interface.

Figure 2:
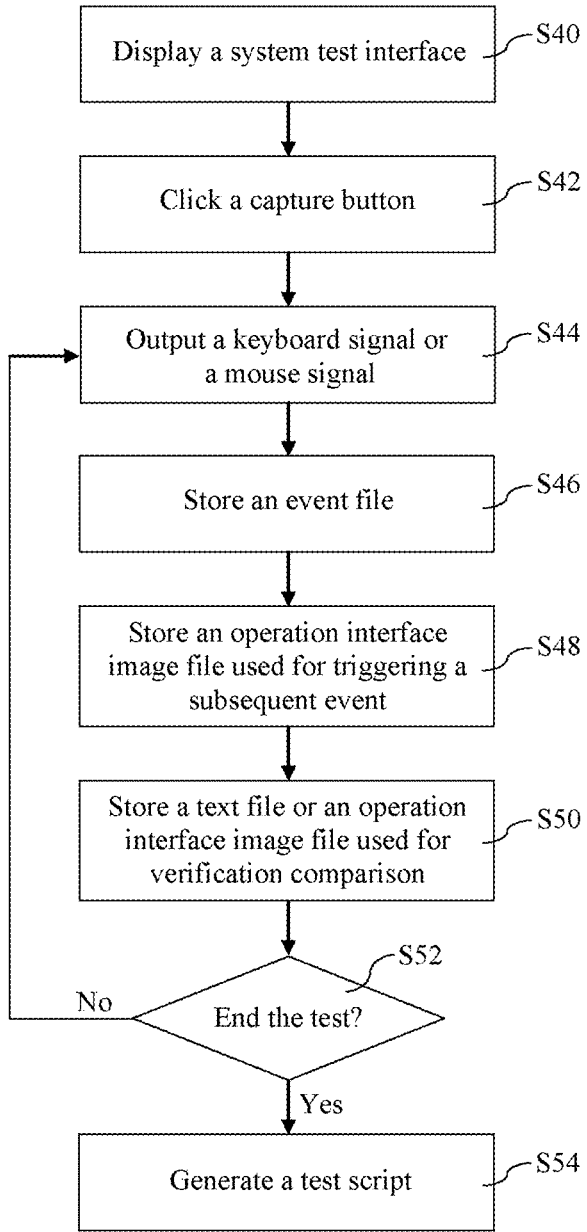
FIG. 2 is a flowchart of a case where an automatic test system operates in a capture mode according to the present invention.

FIG. 2 is a flowchart of a case where an automatic test system operates in a capture mode according to the present invention. Refer to the components in FIG. 1 during the description of process steps of FIG. 2.

The automatic test system uses a capture technology. When the automatic test system operates in a capture mode, a test engineer first operates a test case in a correct to-be-tested system, such as an industrial computer. The automatic test system captures the test process of the correct to-be-tested system, so as to edit the test process into a correct system behavior case, which is used as a correctness reference in future regression testing.

Figure 3A:
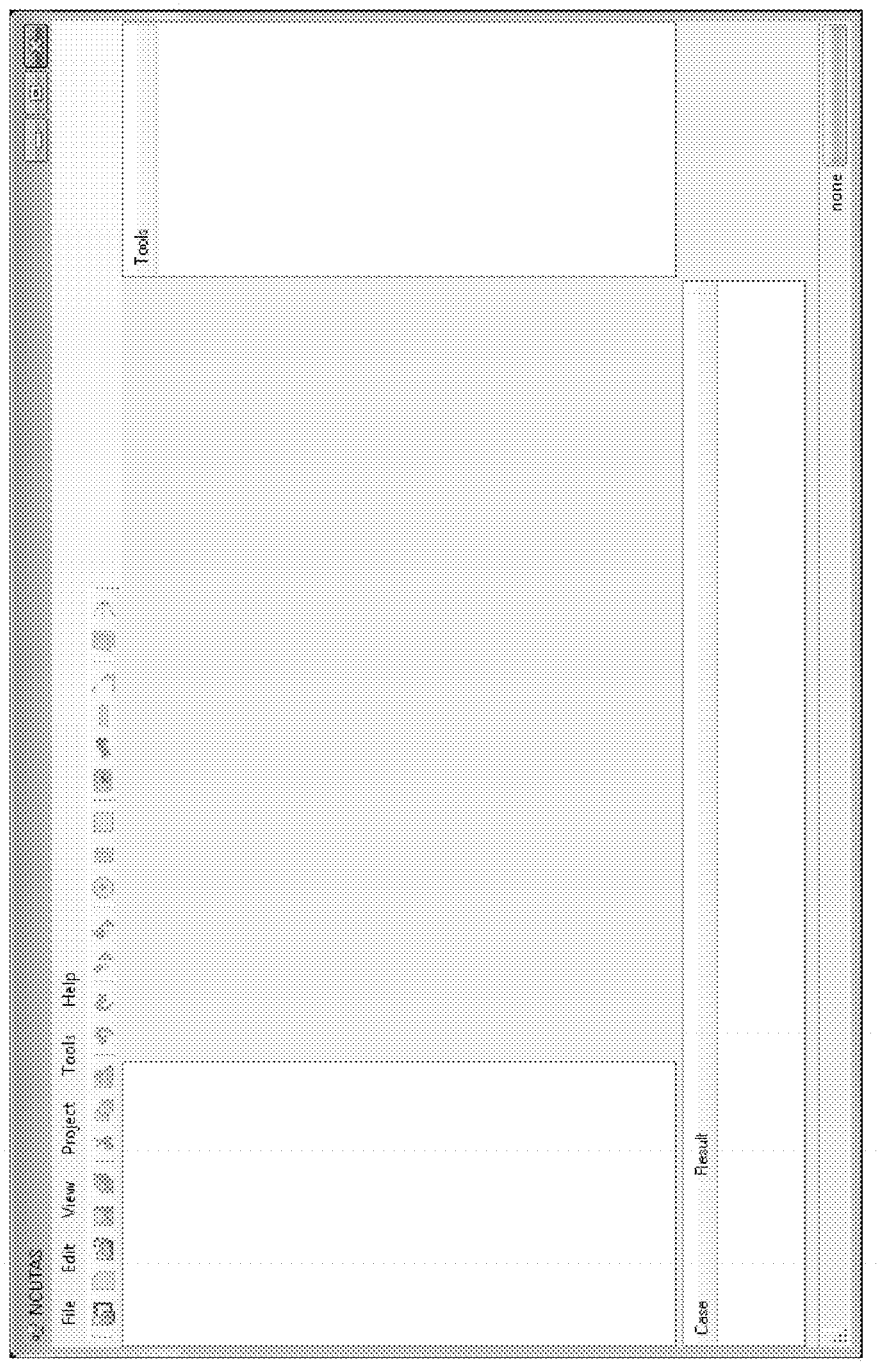
FIG. 3A is a schematic view of a system test interface according to the present invention.
Figure 3B:
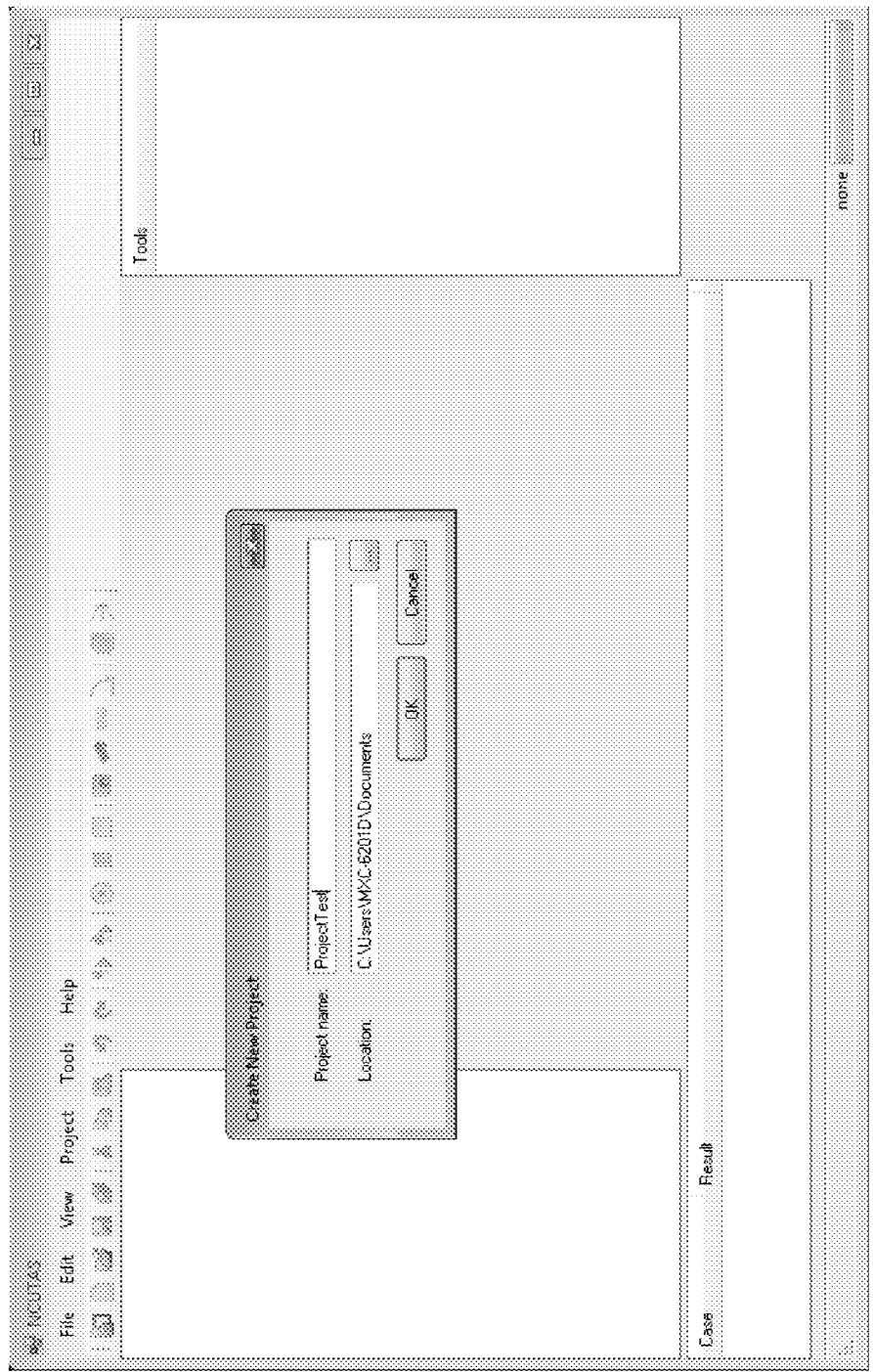
FIG. 3B is a schematic view of creating a system test directory in a system test interface according to the present invention.
Figure 3C:
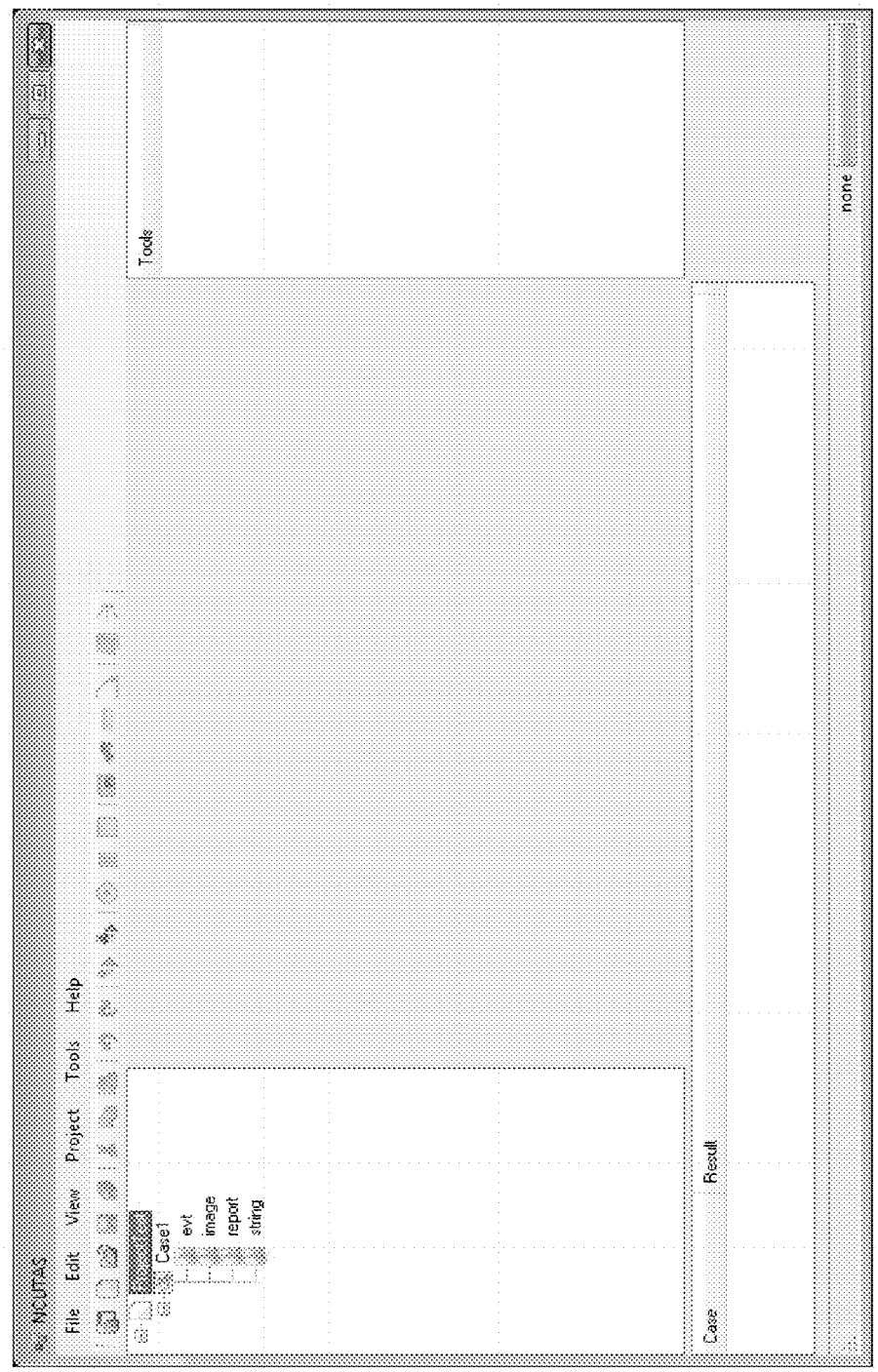
FIG. 3C is a schematic view of creating directories of an event file, an image file, and a text file in a system test directory in a system test interface according to the present invention.

In FIG. 2, a correct to-be-tested system 30 is prepared, which is used as a to-be-tested system when the automatic test system operates in a capture mode. The capture and replay verification module 20 executes automatic test software and displays a system test interface on a screen (not shown) (Step S40), as shown in FIG. 3A, which is a schematic view of a system test interface according to the present invention. The test engineer creates a new test case in the system test interface, that is, creates a new system test directory, as shown in FIG. 3B, which is a schematic view of creating a system test directory in a system test interface according to the present invention; and the test engineer creates a directory of an event file, a directory of an image file, a directory of a text file, and so on, as shown in FIG. 3C, which is a schematic view of creating directories of an event file, an image file, and a text file in a system test directory in a system test interface according to the present invention.

Figure 4:
FIG. 4 is a schematic view of displaying an image of a to-be-tested system according to the present invention.

The test engineer clicks a capture button in the system test interface to generate a capture signal, which is sent to the capture and replay verification module 20. At this time, the image acquisition module 22 receives an image output by a program currently executed by the correct to-be-tested system 30, converts the received image into a received image file, and sends the received image file to the capture and replay verification module 20. The capture and replay verification module 20 executes the received image file and displays, in the system test interface, the image of the program currently executed by the correct to-be-tested system 30 (Step S42), as shown in FIG. 4, which is a schematic view of displaying an image of a to-be-tested system according to the present invention.

In the operation interface of the correct to-be-tested system 30, the test engineer outputs a keyboard signal or a mouse signal by using the keyboard 26 or the mouse 28 to the capture and replay verification module 20; the capture and replay verification module 20 converts the received keyboard signal into character string data (such as English letter characters) and converts the received mouse signal into digital data (such as coordinate position data or moving speed data); the capture and replay verification module 20 temporarily stores the character string data or the digital data, and also temporarily stores a delay time triggered by the keyboard 26 or the mouse 28.

Then, the capture and replay verification module 20 sends, to the USB simulator 24, the character string data or digital data corresponding to the keyboard signal or mouse signal; the USB simulator 24 separately converts the received character string data or digital data into the keyboard signal or mouse signal, and outputs the signal to the correct to-be-tested system 30, so that the keyboard signal or mouse signal is used as an operation instruction or operation data of the correct to-be-tested system 30 (Step S44).

Figure 5:
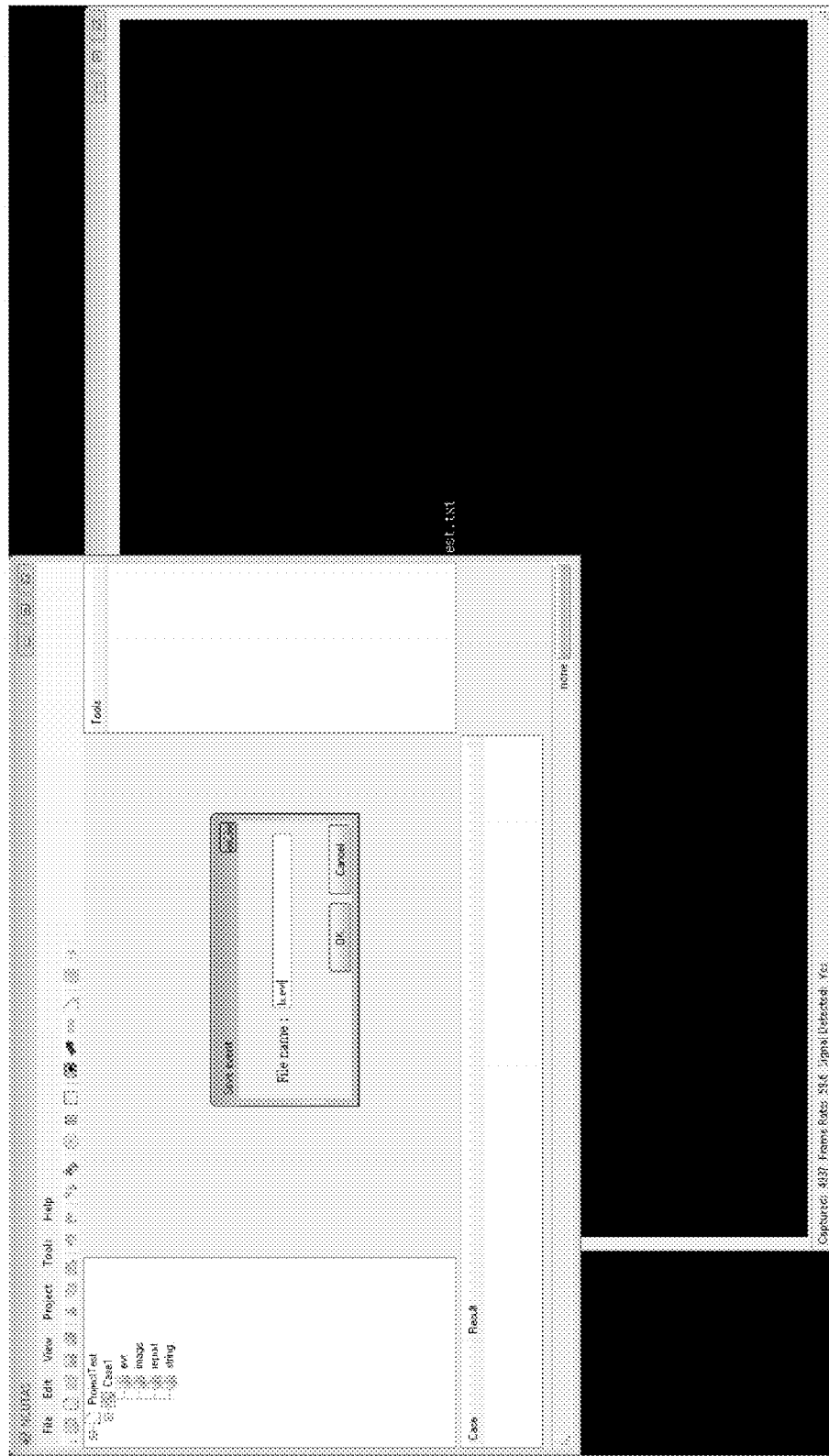
FIG. 5 is a schematic view of storing an event file according to the present invention.

The test engineer may store, at any test time point of the automatic test according to an actual requirement, an event generated by operating the keyboard 26 or the mouse 28 as an event file, that is, the capture and replay verification module 20 stores the at least one of the temporarily stored character string data or digital data, which is corresponding to the keyboard signal or mouse signal, as an event file, and therefore can store all events generated by the keyboard 26 or the mouse 28 during the whole automatic test process as a plurality of event files, as shown in FIG. 5, which is a schematic view of storing an event file according to the present invention, where the event file also includes the delay time triggered by the keyboard signal or mouse signal (Step S46).

Figure 6:
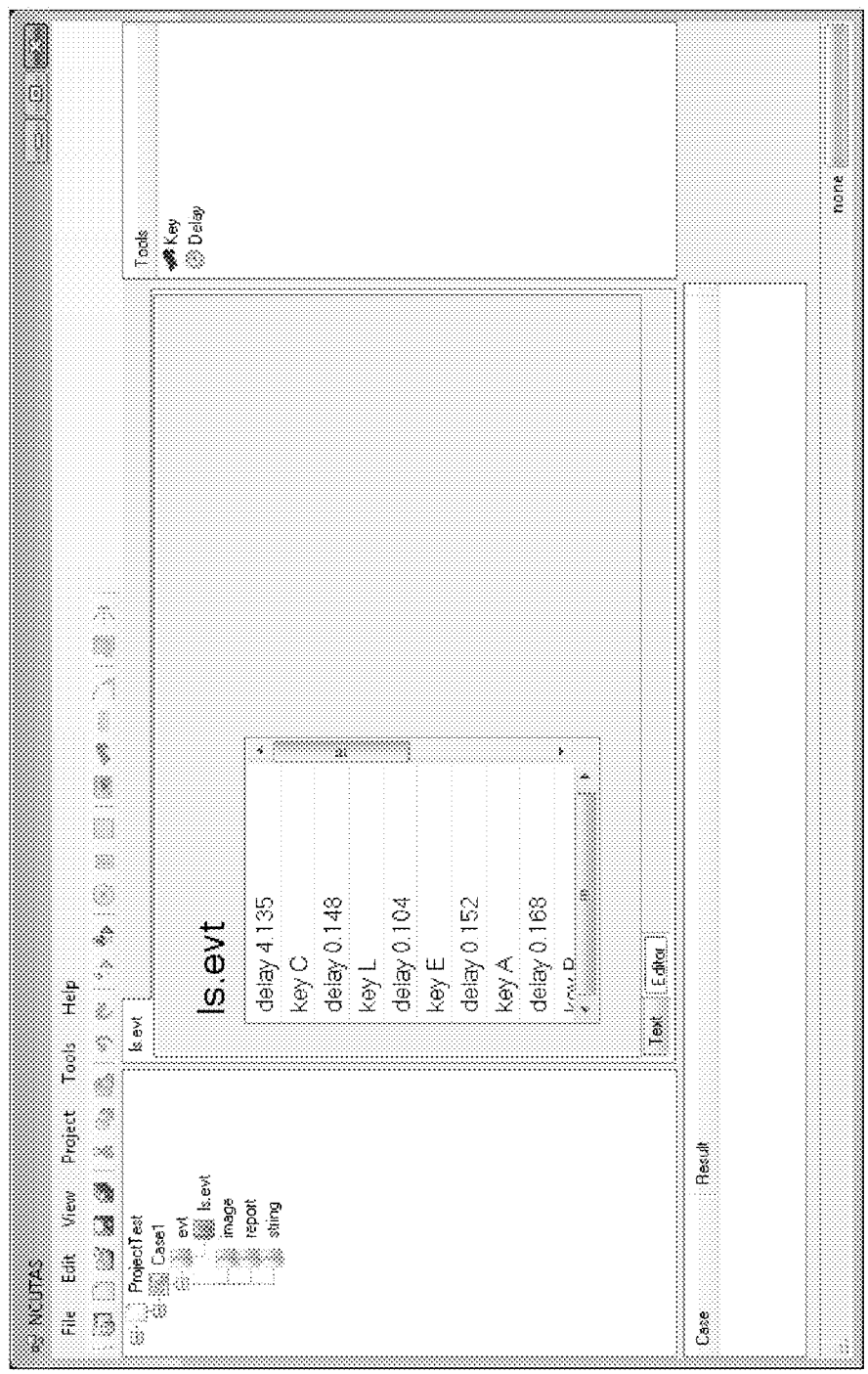
FIG. 6 is a schematic view of opening an event file in a system test interface according to the present invention.

The content of the stored event file may be opened and edited in the system test interface, as shown in FIG. 6, which is a schematic view of opening an event file in a system test interface according to the present invention. The delay time triggered by the keyboard signal or mouse signal may be substituted by a parameter value, and when an industrial computer is tested, the test time may be reduced according to the setting of the parameter value.

Figure 7:
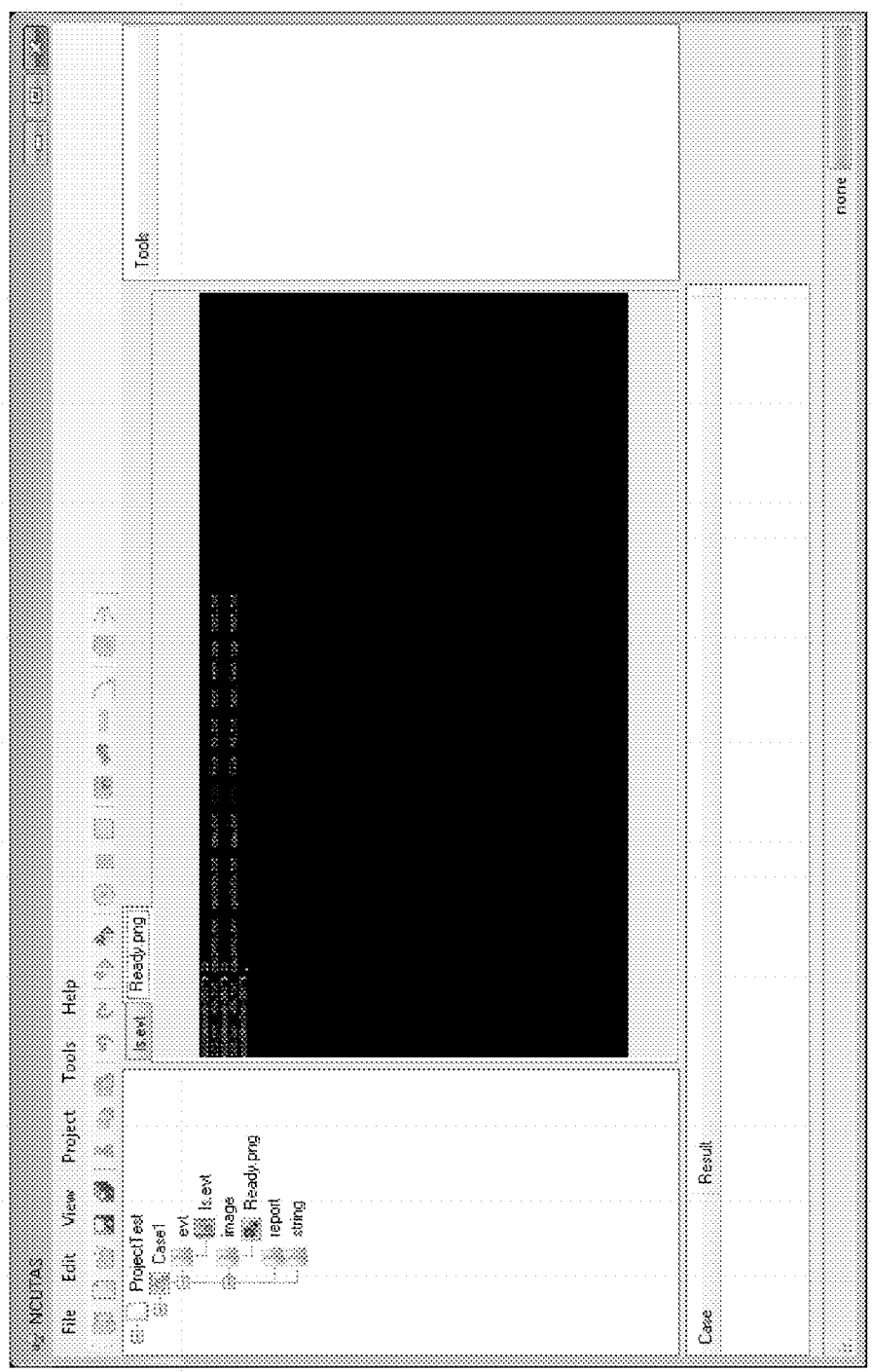
FIG. 7 is a schematic view of acquiring an image of a to-be-tested system according to the present invention.

Triggering a keyboard event is used as an example. A keyboard event usually uses a time interval (that is, the delay time) for operating the keyboard 26 by a test engineer as a reference. However, different to-be-tested systems 30 may have different response times when executing a program. If the automatic test system does not wait long enough for the response of the to-be-tested system 30 before sending a keyboard event to the to-be-tested system 30, a replay error may occur in the subsequent replay mode. In other words, in a process of automatically testing the to-be-tested system 30, because the automatic test system sends a keyboard event to the to-be-tested system 30 before receiving the response of the to-be-tested system 30, the keyboard event is lost and the automatic test consequently fails; if the automatic test system waits too long for the response of the to-be-tested system 30, the time of the automatic test is too long. To reduce the waiting time of the automatic test, the test engineer may acquire an image of the correct to-be-tested system 30 at an appropriate time point, and use the image of the correct to-be-tested system 30 as a precondition for triggering an event subsequently, as shown in FIG. 7, which is a schematic view of acquiring an image of a to-be-tested system according to the present invention. When replaying the test case, if the precondition is satisfied, the automatic test system directly triggers the subsequent event and sends the event to the to-be-tested system 30.

When the test engineer chooses to acquire an operation interface of the correct to-be-tested system 30 at an appropriate time point, the test engineer clicks a precondition button to send a precondition signal to the capture and replay verification module 20; the capture and replay verification module 20 sets the received image file corresponding to the image currently displayed in the system test interface as a precondition image file, and the capture and replay verification module 20 stores the precondition image file in the system test directory according to a file storing sequence in the capture mode, so as to use the precondition image file to trigger an event subsequently (Step S48).

When the test engineer chooses to acquire an image of the correct to-be-tested system 30, after receiving the precondition signal, the capture and replay verification module 20 first stores all events of the keyboard 26 or the mouse 28 (namely, keyboard signals or mouse signals output by the keyboard 26 or the mouse 28) in an event file, and stores the event file in the system test directory; then, the capture and replay verification module 20 captures the precondition image file.

Figure 8:
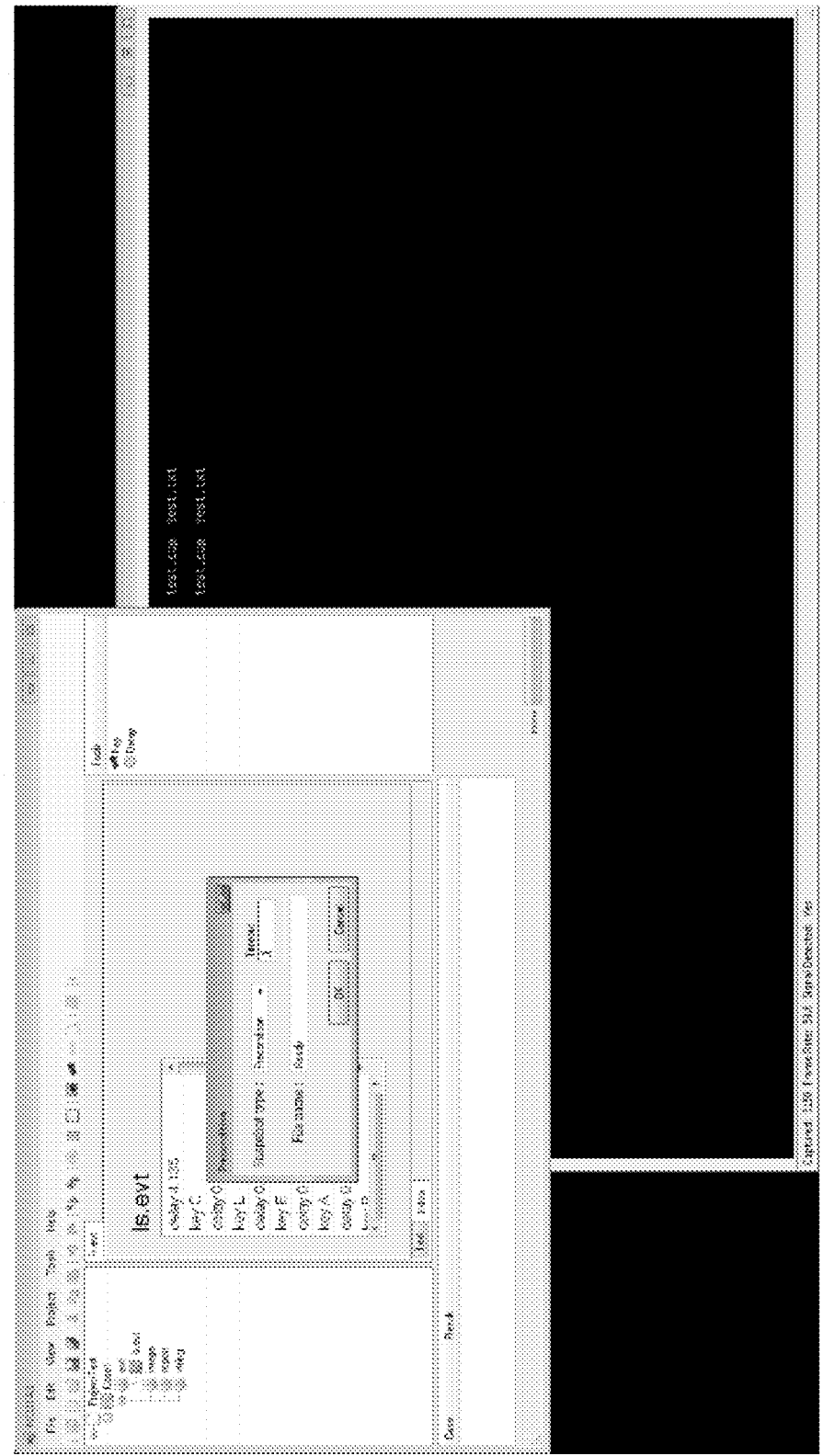
FIG. 8 is a schematic view of opening an event file in a system test interface according to the present invention.

The test engineer can open and edit the event file, as shown in FIG. 8, which is a schematic view of opening an event file in a system test interface according to the present invention. The storing of the event file occurs before the storing of the precondition image file in Step S48.

Figure 9:
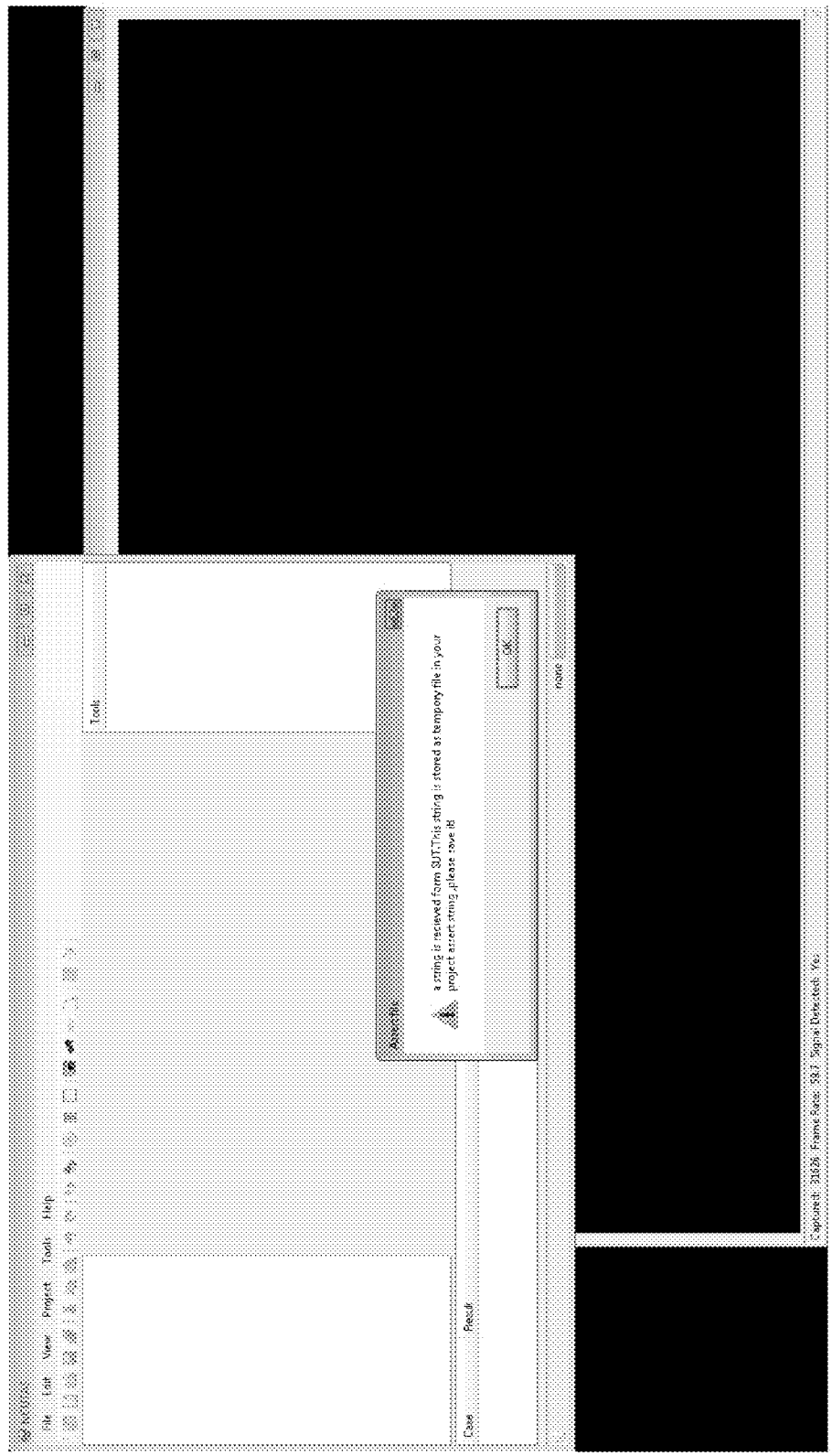
FIG. 9 is a schematic view of acquiring an image of a to-be-tested system according to the present invention.
Figure 10:
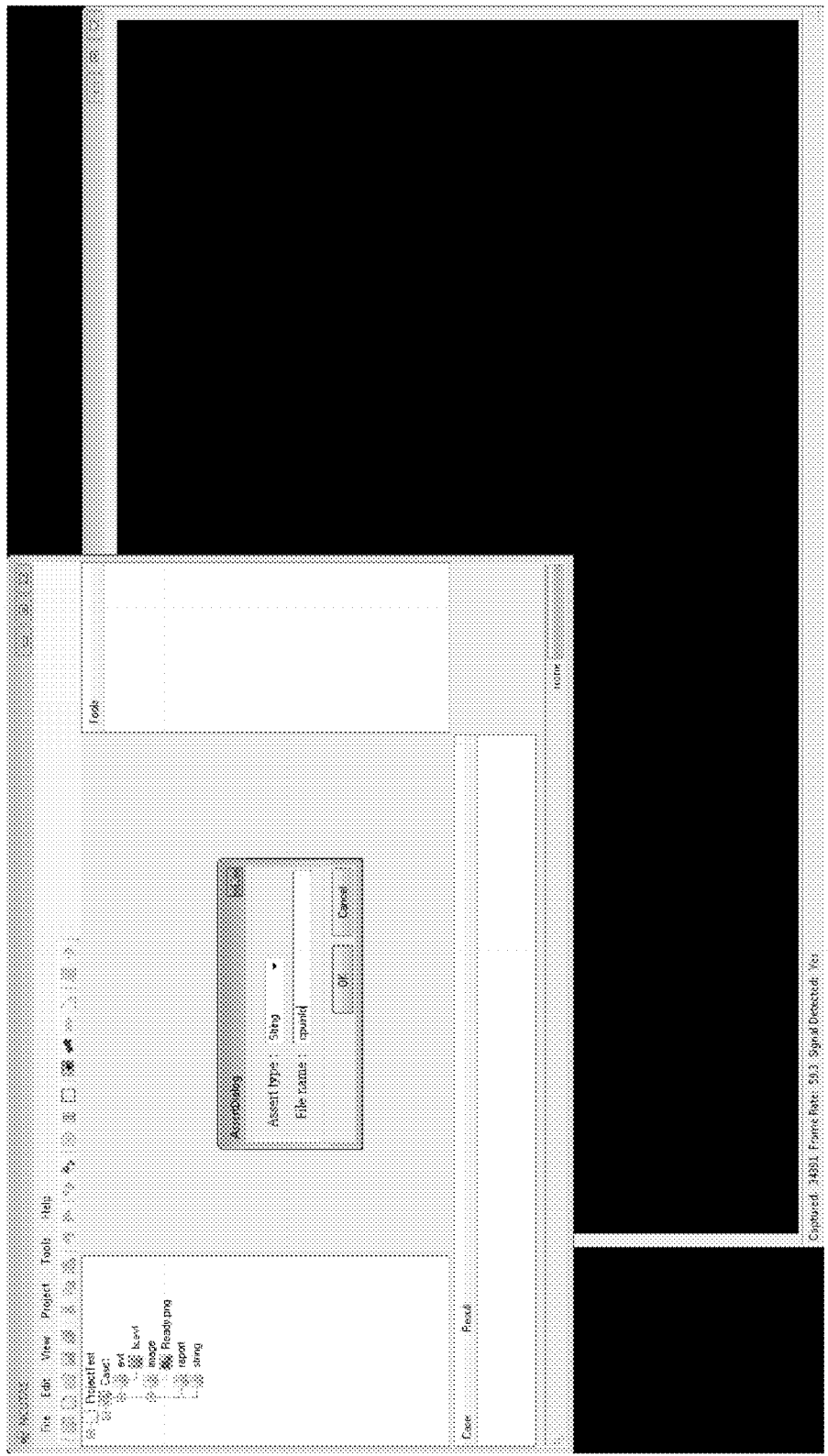
FIG. 10 is a schematic view of opening a screenshot image file in a system test interface according to the present invention.

The test engineer tests the correct to-be-tested system 30 continuously, and when the correct to-be-tested system 30 sends a response to the capture and replay verification module 20, where the response is used as a correct behavior test point of the to-be-tested system 30, the capture and replay verification module 20 stores the response in the form of a character string and as a text file in the system test directory. Alternatively, the capture and replay verification module 20 sets the received image file corresponding to the image currently displayed in the system test interface (the image, corresponding to the response, of the to-be-tested system 30, as shown in FIG. 9, which is a schematic view of acquiring an image of a to-be-tested system according to the present invention) as a correct screenshot image file, and stores the correct screenshot image file in the system test directory, as shown in FIG. 10, which is a schematic view of opening a screenshot image file in a system test interface according to the present invention (Step S50).

When the automatic test system operates in the replay mode, the capture and replay verification module 20 may use the text file and the screenshot image file corresponding to the correct to-be-tested system 30 to verify, by means of comparison, whether the text file and the screenshot image file of the to-be-tested system 30 are correct.

When the test engineer acquires the text character string or image, which is used as the correct behavior verification point, of the correct to-be-tested system 30, before storing the text character string or image, the capture and replay verification module 20 stores all events of the keyboard 26 or the mouse 28 (namely, keyboard signals or mouse signals output by the keyboard 26 or the mouse 28) in an event file, and stores the event file in the system test directory. The storing of the event file occurs before the storing of the text file or the screenshot image file in Step S50.

After Step S50 is performed, it is determined whether a test case of the to-be-tested system 30, which proves to be correct in the test, is captured, that is, whether all tests of the to-be-tested system 30, which proves to be correct in the test, are finished (Step S52); if the capture is not finished, Step S44 is performed; and if THE capture is finished, a system test directory used as a test script for testing the to-be-tested system 30 is generated. The capture and replay verification module 20 stores, in the system test directory, at least one of the event file of the correct to-be-tested system 30, the precondition image file used for triggering an event subsequently, and a correct operation interface image file and text file according to a file creating sequence during the test operation of the correct to-be-tested system 30.

Figure 11:
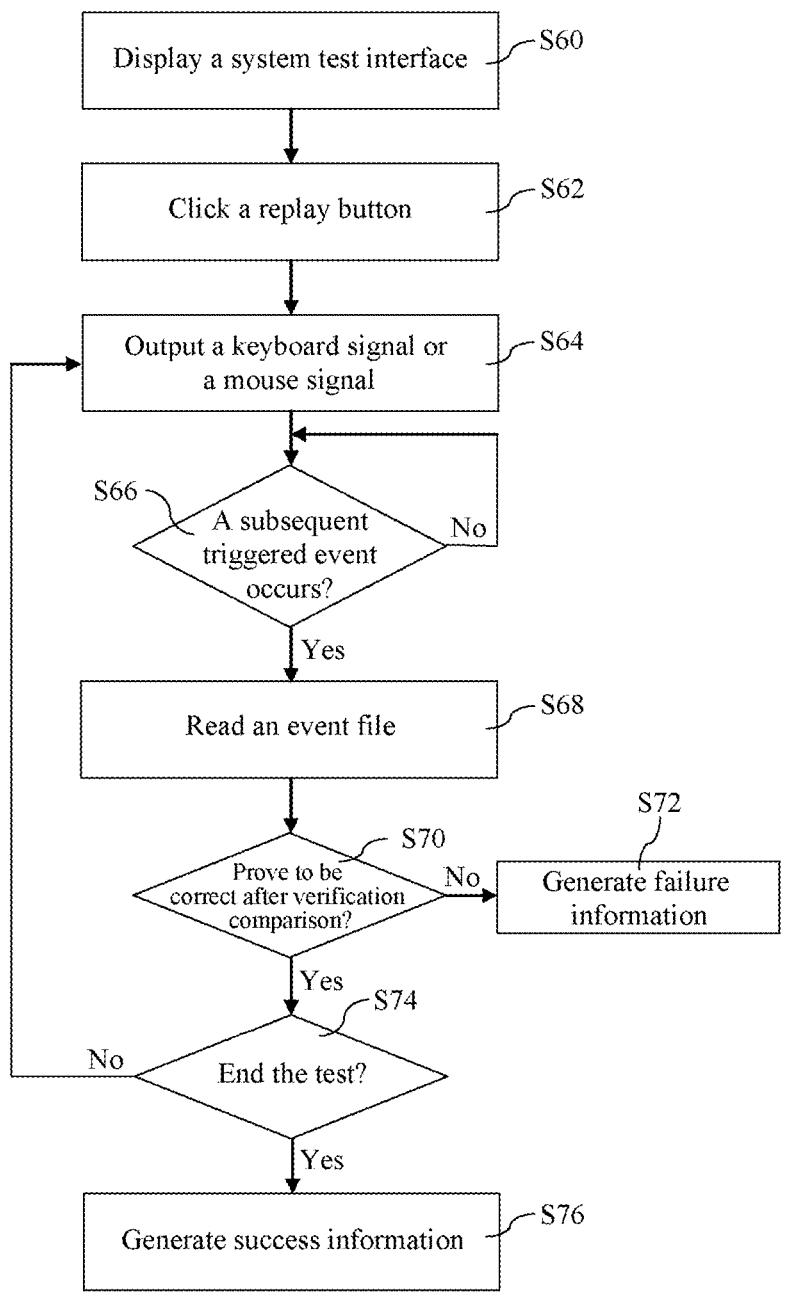
FIG. 11 is a flowchart of a case where an automatic test system operates in a replay mode according to the present invention.

FIG. 11 is a flowchart of a case where an automatic test system operates in a replay mode according to the present invention. Refer to the components in FIG. 1 during the description of process steps of FIG. 11.

When an industrial computer or BIOS changes or is updated and needs to be checked, the automatic test system uses a replay technology; when the automatic test system operates in a replay mode, the test cases (that is, the system test directory) captured in the capture mode are automatically executed on the to-be-tested system, and the test engineer does not need to manually operate these test cases repeatedly, thereby saving a lot of labor and time.

In FIG. 11, the capture and replay verification module 20 executes automatic test software and displays a system test interface on a screen (not shown) (Step S60), as shown in FIG. 3A.

Figure 12:
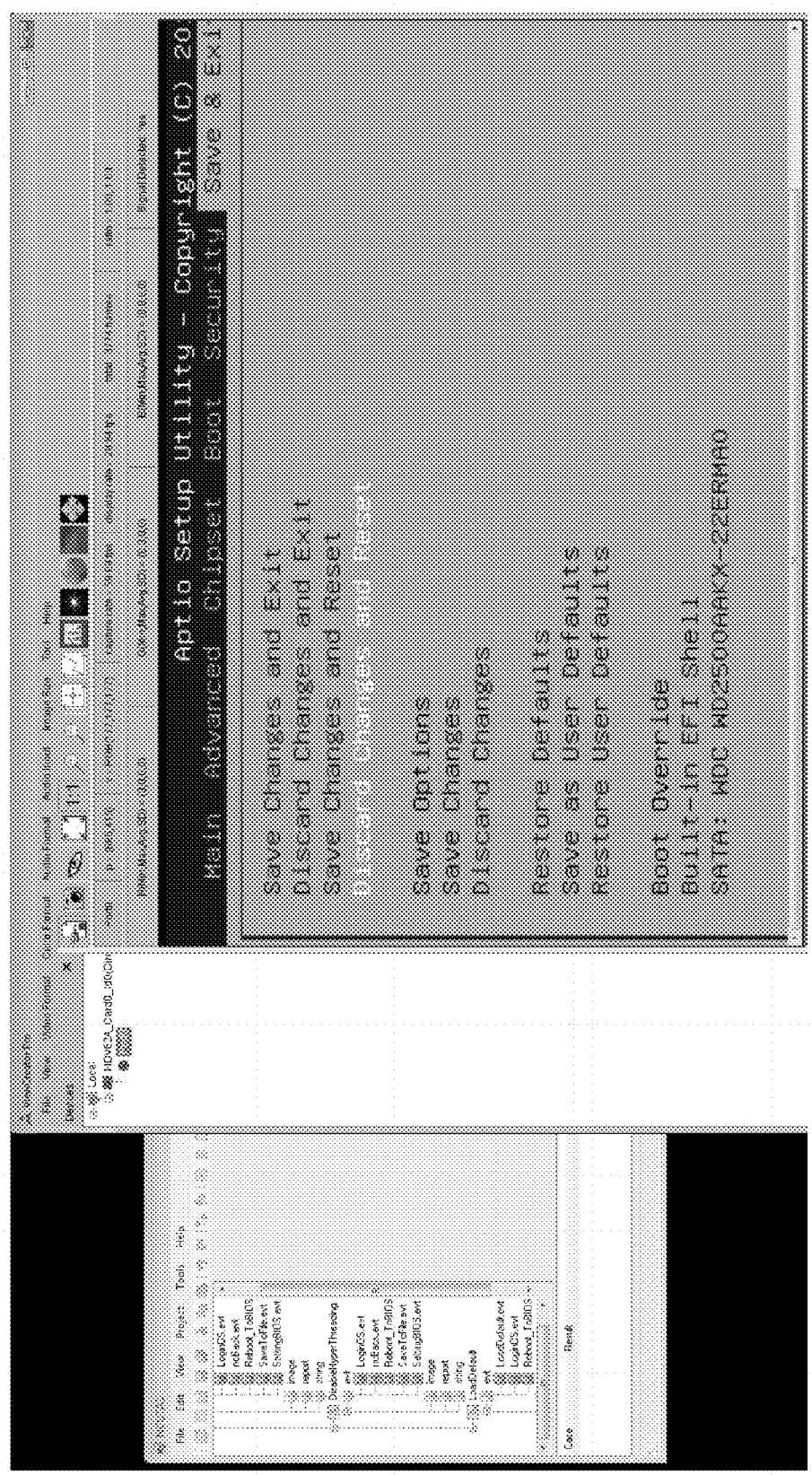
FIG. 12 is a schematic view of displaying an image of a to-be-tested system according to the present invention.

The test engineer clicks a capture button in the system test interface to generate a capture signal, which is sent to the capture and replay verification module 20. At this time, the image acquisition module 22 receives an image output by a program currently executed by a correct to-be-tested system 30, converts the received image into a received image file, and sends the received image file to the capture and replay verification module 20. The capture and replay verification module 20 executes the received image file and displays, in the system test interface, the image of the program currently executed by the correct to-be-tested system 30 (Step S62), as shown in FIG. 12, which is a schematic view of displaying an image of a to-be-tested system according to the present invention.

Then, the capture and replay verification module 20 reads a system test directory (namely, a test script) specified by the test engineer to test the to-be-tested system 30. The capture and replay verification module 20 reads character string data (such as English letter characters) or digital data (such as coordinate position data and moving speed data) and a delay time triggered by the keyboard 26 or the mouse 28 in an event file in the system test directory, and sends the read character string data or digital data and delay time to the USB simulator 24; the USB simulator 24 separately converts the received character string data or digital data into the keyboard signal or mouse signal, and outputs the keyboard signal or mouse signal to the to-be-tested system 30 according to the corresponding delay time, so that the keyboard signal or mouse signal is used as an operation instruction or operation data of the to-be-tested system 30 (Step S64).

The to-be-tested system 30 receives the keyboard signal or mouse signal output by the USB simulator 24, so as to execute a corresponding program. If the capture and replay verification module 20 wants to control the USB simulator 24 to output another keyboard signal or mouse signal to the to-be-tested system 30, the capture and replay verification module 20 waits for a response generated by the to-be-tested system 30 when the to-be-tested system 30 executes the program. When the capture and replay verification module 20 receives at least one response sent by the to-be-tested system 30, the capture and replay verification module 20 sends an image acquisition signal to the image acquisition module 22; after receiving the image acquisition signal, the image acquisition module 22 acquires a screenshot of the to-be-tested system 30 when the to-be-tested system 30 sends the response, converts the screenshot into a screenshot image file, and sends the screenshot image file to the capture and replay verification module 20. The capture and replay verification module 20 reads the precondition image file in the system test directory, and compares the screenshot image file corresponding to the to-be-tested system 30 with the precondition image file used for triggering an event subsequently (Step S66). The capture and replay verification module 20 may perform verification comparison by using a full operation interface, perform verification comparison by acquiring a part of the operation interface, or perform verification comparison by using characters obtained by performing OCR on the operation interface.

If the to-be-tested system 30 does not generate a response, in Step S66, the capture and replay verification module 20 waits for a response generated by the to-be-tested system 30; if it is found by comparison that the screenshot image file corresponding to the to-be-tested system 30 is the same as the precondition image file used for triggering an event subsequently, the capture and replay verification module 20 reads, in an event file which is stored after the precondition image file in the system test directory, character string data or digital data and a delay time generated by the keyboard 26 or mouse 28, and sends the read character string data or digital data and delay time to the USB simulator 24; the USB simulator 24 separately converts the received character string data or digital data into the keyboard signal or mouse signal, and sends the keyboard signal or mouse signal to the to-be-tested system 30 according to the corresponding delay time, so that the keyboard signal or mouse signal is used as an operation instruction or operation data of the to-be-tested system 30 (Step S68).

The to-be-tested system 30 receives the keyboard signal or mouse signal output by the USB simulator 24, so as to execute a corresponding program. If the automatic test system wants to verify whether the program executed by the to-be-tested system 30 is correct, the capture and replay verification module 20 waits for a response generated by the to-be-tested system 30 when the to-be-tested system 30 executes the program, and when receiving a response sent by the to-be-tested system 30, the capture and replay verification module 20 reads the text file in the system test directory, and verifies the response by comparing the response, which is in the form of a character string, with the character string in the text file. Alternatively, the capture and replay verification module 20 sends an image acquisition signal to the image acquisition module 22, and after receiving the image acquisition signal, the image acquisition module 22 acquires a screenshot of the to-be-tested system 30 when the to-be-tested system 30 generates a response, converts the screenshot into a screenshot image file, and sends the screenshot image file to the capture and replay verification module 20; the capture and replay verification module 20 reads the correct screenshot image file in the system test directory, and verifies the screenshot image file corresponding to the to-be-tested system 30 by comparing the screenshot image file with the correct screenshot image file (Step S70). The capture and replay verification module 20 may perform verification comparison by using a full operation interface, perform verification comparison by acquiring a part of the operation interface, or perform verification comparison by using characters obtained by performing OCR on the operation interface.

Figure 13:
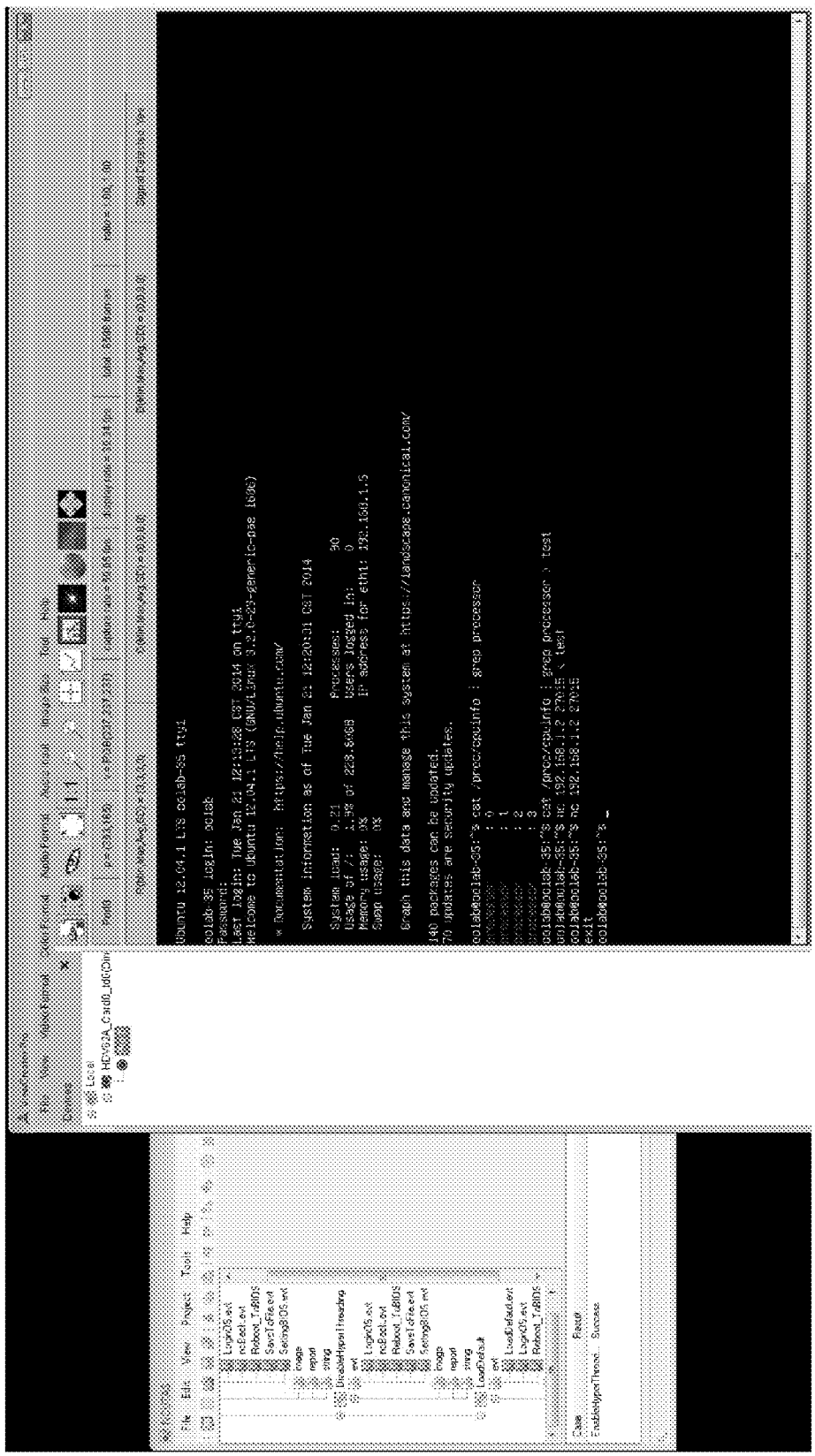
FIG. 13 is a schematic view of displaying test success or failure in a system test interface according to the present invention.

If it is found by verification comparison that the character string of the response is different from the character string in the text file or the screenshot image file corresponding to the to-be-tested system 30 is different from the correct screenshot image file, the capture and replay verification module 20 generates failure information, displays it in the system test interface, and ends the automatic test process, as shown in FIG. 13, which is a schematic view of displaying test success or failure in a system test interface according to the present invention (Step S72).

If it is found by verification comparison that the character string of the response is the same as the character string in the text file or the screenshot image file corresponding to the to-be-tested system 30 is the same as the correct screenshot image file, it is determined whether the automatic test system finishes replay of the test case for testing the to-be-tested system 30, that is, whether all tests for testing the to-be-tested system 30 are finished (Step S74); if the replay is not finished, Step S64 is performed; and if the replay is finished, the capture and replay verification module 20 generates success information and displays it in the system test interface, as shown in FIG. 13 (Step S76).

The foregoing automatic test method for an industrial computer according to the present invention may be implemented by using a program, and the program may be stored in a record medium; after loading the program in the record medium and executing the program, the automatic test system is capable of performing the method steps described above and shown in the drawings.

Similarly, the foregoing method of the present invention may be implemented by using a program product; after loading the program product on the Internet for example, and executing the program product, the system is capable of performing the method steps described above and shown in the drawings.

The present invention provides an automatic test system and test method for a computer, a record medium, and a program product, which have the following advantages: capture and replay technologies are used; a test engineer first operates a test case in a correct system; the automatic test system captures the test process, so as to edit the test process into a correct system behavior case, which is used as a correctness reference in future regression testing; when a computer or BIOS changes or is updated and needs to be checked, these captured test cases are automatically executed on the to-be-tested system, and the test engineer does not need to manually operate these test cases repeatedly, thereby saving a lot of labor and time.

The present invention is described above with reference to the preferred embodiments and exemplary accompanying drawings, but is not limited thereto. Any modifications, omissions, and changes made by those skilled in the art to the content of the implementation manner and specific embodiments of the present invention fall within the scope of the claims of the present invention.

What is claimed is:

1. An automatic test method for a computer, comprising the following steps:
   reading, by a capture and replay verification module of an automatic test system, a keyboard signal or a mouse signal, and a delay time triggered by the keyboard signal or the mouse signal in an event file in a system test directory;
   sending, by the capture and replay verification module, one of the keyboard signal or the mouse signal to a to-be-tested system of the automatic test system according to the triggered delay time and through a universal serial bus (USB) simulator of the automatic test system, wherein the to-be-tested system operates according to the keyboard signal or the mouse signal;

sending, by the to-be-tested system, at least one response to the capture and replay verification module, wherein the at least one response is in the form of a character; and verifying, by the capture and replay verification module, the at least one response by comparing the response with a character string in a correct text file in the system test directory;

sending, by the capture and replay verification module, an image acquisition signal to an image acquisition module of the automatic test system according to the at least one response;

acquiring, by the image acquisition module, a screenshot in the to-be-tested system;

converting, by the image acquisition module, the screenshot into a screenshot image file; and sending, by the image acquisition module, the screenshot image file to the capture and replay verification module;

verifying, by the capture and replay verification module, the screenshot image file corresponding to the to-be-tested system by comparing the screenshot image file with a correct screenshot image file in the system test directory.

2. The method according to claim 1, further comprising:
preparing, prior to reading the event file, a correct to-be-tested system;

displaying, by the capture and replay verification module, a system test interface on a screen of the automatic test system;

sending, by the capture and replay verification module, a capture signal to the image acquisition module;

receiving, by the image acquisition module, an image output by the correct to-be-tested system;

converting, by the image acquisition module, the received image into a received image file;

sending, by the image acquisition module, the received image file to the capture and replay verification module;

displaying, by the capture and replay verification module, the received image file in the system test interface;

outputting, by the keyboard or the mouse, the keyboard signal or the mouse signal to the capture and replay verification module;

temporarily storing, by the capture and replay verification module, the keyboard signal or the mouse signal;

sending, by the capture and replay verification module, the keyboard signal or the mouse signal to the correct to-be-tested system through the USB simulator of the automatic test system;

storing, by the capture and replay verification module, the temporarily stored keyboard signal or mouse signal as the event file, wherein the event file also comprises the delay time triggered by the keyboard signal or the mouse signal;

storing, by the capture and replay verification module and subsequent to the correct to-be-tested system having sent at least one response to the capture and replay verification module, the at least one response in the form of a character string and as the text file;

setting, by the capture and replay verification module, the received image file corresponding to the image currently displayed in the system test interface as a correct screenshot image file, wherein the correct text file and screenshot image file are usable to perform a verification comparison; and storing, by the capture and replay verification module, in the system test directory, at least one of the event file of the correct to-be-tested system, the correct screenshot image file, and the correct text file.

3. The method according to claim 2, further comprising:
receiving, by the capture and replay verification module, a precondition signal;

setting, by the capture and replay verification module, the received image file corresponding to the image currently displayed in the system test interface as a precondition image file triggering, by the capture and replay verification module, an event using the precondition image file; and storing, by the capture and replay verification module, the precondition image file in the system test directory.

4. The method according to claim 3, further comprising:
sending, by the capture and replay verification module and subsequent to receiving the at least one response from the to-be-tested system, the image acquisition signal to the image acquisition module according to the at least one response;

acquiring, by the image acquisition module, the screenshot in the to-be-tested system;

converting, by the image acquisition module, the screenshot into the screenshot image file;

sending, by the image acquisition module, the screenshot image file to the capture and replay verification module;

verifying, by the capture and replay verification module, the screenshot image file corresponding to the to-be-tested system by comparing the screenshot image file with the precondition image file in the system test directory; and sending, by the capture and replay verification module and subsequent to having verified that the screenshot image file corresponding to the to-be-tested system is the same as the precondition image file, the keyboard signal or the mouse signal to the to-be-tested system through the USB simulator according to a triggered delay time in a next event file.

5. The method according to claim 4, wherein comparing the screenshot image file with the correct screenshot image file or the precondition image file in the system test directory comprises performing the comparison by using a full operation interface, a part of an operation interface, or characters obtained by performing optical graphic recognition on an operation interface.

6. The method according to claim 3, further comprising storing, by the capture and replay verification module and prior to the capture and replay verification module receiving the precondition signal, the temporarily stored keyboard signal or mouse signal and the delay time triggered by the keyboard signal or the mouse signal as a new event file.

7. The method according to claim 2, further comprising:
converting, by the capture and replay verification module, the keyboard signal into character string data, and converts the mouse signal into digital data;

temporarily storing, by the capture and replay verification module, the character string data and digital data that are converted from the keyboard signal and the mouse signal;

sending, by the capture and replay verification module, character string data and digital data to the USB simulator;

converting, by the USB simulator, the received character string data and digital data into the keyboard signal or the mouse signal; and outputting, by the USB simulator, the keyboard signal or the mouse signal to the to-be-tested system.

8. An automatic test system for a computer, the automatic test system comprising:

a keyboard;

a mouse;

a to-be-tested system to operate according to a keyboard signal of the keyboard or a mouse signal of the mouse;

a universal serial bus (USB) simulator;

an image acquisition module;

a capture and replay verification module configured to (i) read the keyboard signal or the mouse signal, and a delay time triggered by the keyboard signal or the mouse signal in an event file in a system test directory (ii) send one of the keyboard signal or the mouse signal to the to-be-tested system according to the triggered delay time and through the USB simulator, (iii) receive at least one response in the form of a character, (iv) verify the at least one response by comparing the response with a character string in a correct text file in the system test directory, and (v) send an image acquisition signal to the image acquisition module according to the at least one response, and wherein the image acquisition module is configured to (i) acquire a screenshot in the to-be-tested system, (ii) convert the screenshot into a screenshot image file, and send the screenshot image file to the capture and replay verification module, and wherein the capture and replay verification module is further configured to verify the screenshot image file corresponding to the to-be-tested system by comparing the screenshot image file with a correct screenshot image file in the system test directory.

9. The automatic test system of claim 8, further comprising a correct to-be-tested system, wherein the capture and replay verification module is configured to:

display a system test interface on a screen of the automatic test system;

send a capture signal to the image acquisition module;

receive an image output by the correct to-be-tested system;

convert the received image into a received image file;

send the received image file to the capture and replay verification module;

display the received image file in the system test interface;

output, by the keyboard or the mouse, the keyboard signal or the mouse signal to the capture and replay verification module;

store, temporarily, the keyboard signal or the mouse signal;

send the keyboard signal or the mouse signal to the correct to-be-tested system through the USB simulator of the automatic test system;

store the temporarily stored keyboard signal or mouse signal as the event file, wherein the event file also comprises the delay time triggered by the keyboard signal or the mouse signal;

store, subsequent to the correct to-be-tested system having sent at least one response to the capture and replay verification module, the at least one response in the form of a character string and as the text file;

set the received image file corresponding to the image currently displayed in the system test interface as a correct screenshot image file, wherein the correct text file and screenshot image file are usable to perform a verification comparison; and store, in the system test directory, at least one of the event file of the correct to-be-tested system, the correct screenshot image file, and the correct text file.

10. The automatic test system of claim 9, wherein the capture and replay verification module is further configured to:

receive a precondition signal;

set the received image file corresponding to the image currently displayed in the system test interface as a precondition image file;

trigger an event using the precondition image file; and store the precondition image file in the system test directory.

11. The automatic test system of claim 10, wherein the capture and replay verification module is further configured to send, subsequent to having received the at least one response from the to-be-tested system, the image acquisition signal to the image acquisition module according to the at least one response, wherein the image acquisition module is further configured to (i) acquire the screenshot in the to-be-tested system, (ii) convert the screenshot into the screenshot image file, and (iii) send the screenshot image file to the capture and replay verification module, wherein the capture and replay verification module is further configured to (i) verify the screenshot image file corresponding to the to-be-tested system by comparing the screenshot image file with the precondition image file in the system test directory and (ii) send, subsequent to having verified that the screenshot image file corresponding to the to-be-tested system is the same as the precondition image file, the keyboard signal or the mouse signal to the to-be-tested system through the USB simulator according to a triggered delay time in a next event file.

12. The automatic test system of claim 11, wherein to compare the screenshot image file with the correct screenshot image file or the precondition image file in the system test directory comprises to perform the comparison as a function of a full operation interface, a part of an operation interface, or characters obtained by performing optical graphic recognition on an operation interface.

13. The automatic test system of claim 10, wherein the capture and replay verification module is further configured to store, prior to the capture and replay verification module having received the precondition signal, the temporarily stored keyboard signal or mouse signal and the delay time triggered by the keyboard signal or the mouse signal as a new event file.

14. The automatic test system of claim 9, wherein the capture and replay verification module is further configured to (i) convert the keyboard signal into character string data, and converts the mouse signal into digital data, (ii) store, temporarily, the character string data and digital data that are converted from the keyboard signal and the mouse signal, and (iii) send character string data and digital data to the USB simulator, and wherein the USB simulator is configured to (i) convert the received character string data and digital data into the keyboard signal or the mouse signal and (ii) output the keyboard signal or the mouse signal to the to-be-tested system.

* * * * *